United States Patent [19]

Nozawa et al.

[11] 4,287,460

[45] Sep. 1, 1981

[54] POSITIONING CONTROL SYSTEM

[75] Inventors: Ryoichiro Nozawa, Tokyo; Yoichi Amemiya, Hachioji; Mitsuo Matsui, Tokyo; Shigeru Isohata, Hino; Takao Sasaki, Hachioji; Yoshitaka Takekoshi, Hino, all of Japan

[73] Assignee: Fujitsu Fanuc Limited, Tokyo, Japan

[21] Appl. No.: 20,197

[22] Filed: Mar. 13, 1979

[30] Foreign Application Priority Data

Mar. 16, 1978 [JP] Japan ............................... 53-30412

[51] Int. Cl.³ .......................................... G05B 19/24
[52] U.S. Cl. .................................... 318/571; 318/561; 408/12
[58] Field of Search ............... 318/571, 561, 460, 488, 318/39; 360/474; 408/10, 11, 12

[56] References Cited

U.S. PATENT DOCUMENTS

| 3,671,840 | 6/1972 | Meyer et al. | 318/571 |
| 3,809,986 | 5/1974 | Visser | 318/561 |
| 4,031,443 | 6/1977 | Droux et al. | 318/561 |

OTHER PUBLICATIONS

Position Control Servomechanism, J. W. Legate, IBM Technical Disclosure Bulletin, vol. 16, No. 6, 11/73.

*Primary Examiner*—B. Dobeck
*Attorney, Agent, or Firm*—Staas & Halsey

[57] ABSTRACT

The time for positioning of a machine under numerical control is determined so that the positioning is finished at the moment when the amplitude of vibration of the machine is reduced to zero. In the thus predetermined time at least accelerating control and decelerating control are conducted to achieve control for positioning the machine at a commanded position.

5 Claims, 5 Drawing Figures

POSITIONING CONTROL SYSTEM

BACKGROUND OF THE INVENTION

1. Field of the Invention

This invention relates to a positioning control system which ensures accurate positioning of a machine under numerical control.

2. Description of the Prior Art

The positioning of a machine under numerical control is generally achieved by effecting accelerating and decelerating control at the starting and stopping of the machine in consideration of the characteristics of a drive motor, the torque and inertia of the machine, etc. Such accelerating-decelerating control is usually performed linearly or in the manner of an exponential function. In the linear accelerating and decelerating control, for example, as shown in FIG. 1, a feed speed f is linearly increased up to a predetermined value as time t passes after the starting of the machine and held constant at the predetermined value and then linearly decreased to zero after the machine has been moved to the vicinity of its commanded stopping position. In the case where the positioning distance, i.e. the distance between the current position and the commanded stopping position of the machine is short, the feed speed f is reduced as indicated by the broken line.

Also it is known in the art to change the feed accelerating and decelerating speeds with the positioning distance, as shown in FIG. 2. Where the positioning distance is long, the control characteristic is substantially the same as shown in FIG. 1; but where the positioning distance is short, the feed accelerating and decelerating speeds are both increased and the deceleration may in a certain case start before the accelerating speed reaches its predetermined value.

In the positioning operation, however, vibration is sometimes caused, at the end of positioning, by the characteristic of the drive motor and various elements of the machine to make accurate positioning impossible. To prevent such an adverse influence of vibration, it has also been proposed to adopt the combined use of the linear and the exponential-function type decelerating characteristic. With this method, however, the positioning time becomes longer, so that accurate and high-speed positioning is difficult in the case of a machine tool requiring high-speed positioning, such as, for example, a punch press.

SUMMARY OF THE INVENTION

This invention is to provide a positioning control system in which the time for positioning a machine under numerical control is determined corresponding to the period of vibration of the machine and the positioning is achieved in the predetermined time regardless of whether the positioning distance is long or short, thereby eliminating the influence of vibration of the machine to ensure accurate and high-speed positioning.

Briefly stated, in the positioning control system of this invention, the positioning time is determined corresponding to the period of vibration of a machine under numerical control and, in the positioning time, at least accelerating control and decelerating control for positioning the machine at an instructed position are performed, thereby to complete the positioning when the amplitude of vibration is zero.

DESCRIPTION OF THE PREFERRED EMBODIMENTS

Figure 1:
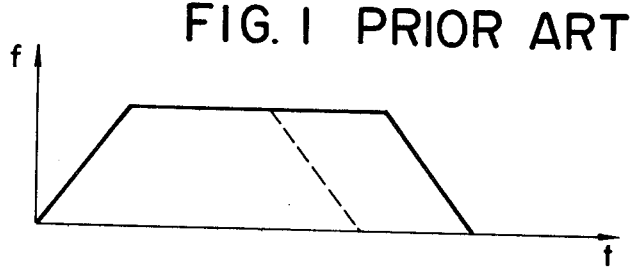
FIGS. 1 and 2 are graphs explanatory of conventional positioning control operations.
Figure 2:
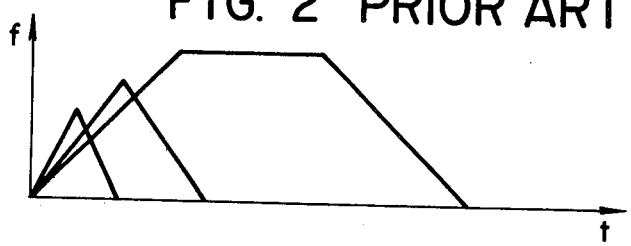
Figure 3:
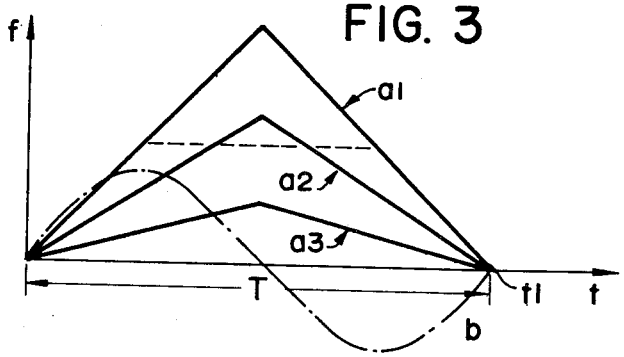
FIGS. 3 and 4 are graphs explanatory of operations of examples of this invention.

FIG. 3 is explanatory of the control characteristic of an example of this invention, in which when the period of vibration of a machine is T as indicated by a curve b of a one-dot chain line, the positioning time t1 is determined to be equal to the period T regardless of the positioning distance used. Accordingly, accelerating-decelerating control, which follows each of curves a1 to a3 in accordance with a particular positioning distance used, is conducted to stop the machine at a moment t1 when the amplitude of vibration of the machine is reduced to zero. In this case, if the feed accelerating and decelerating speeds are selected equal to each other, the feed speed becomes maximum at a moment T/2.

Figure 4:
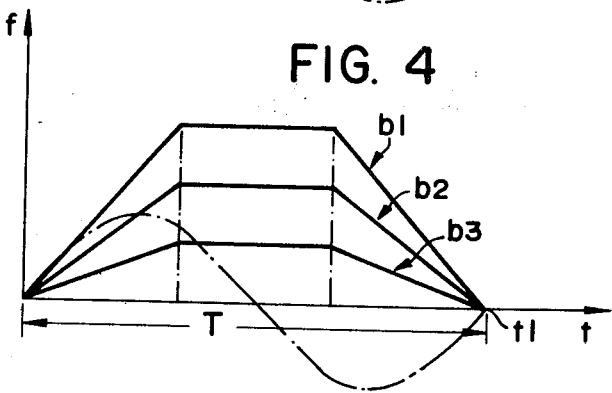

FIG. 4 is explanatory of the control characteristic of another example of this invention, in which control, following each of curves b1 to b3 in accordance with a particular positioning distance used, is effected and in which the positioning time includes an accelerating, a constant-speed and a decelerating period. This method facilitates control when the period of T of vibration of the machine is divided into the abovesaid three periods but such a division is not always required; for example, it is also possible to define the maximum speed as indicated by the broken line in FIG. 3 and to start the constant-speed control when the maximum speed is reached.

Figure 5:
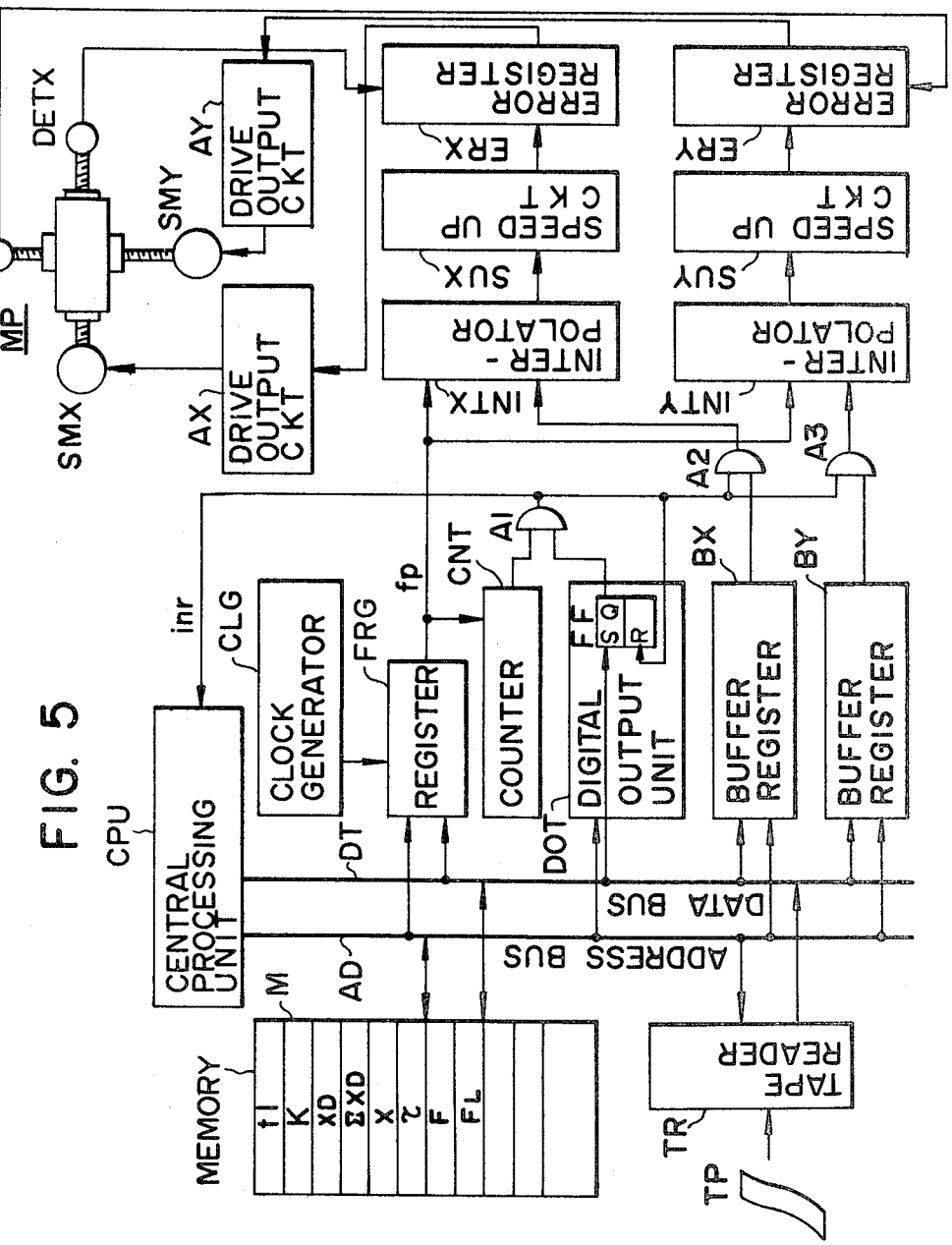
FIG. 5 is a block diagram showing a specific operative example of this invention.

FIG. 5 illustrates in block form a specific operative example of this invention comprising: a memory M; a central processing unit CPU; an address bus AD; a data bus TD; a command tape TP; a tape TR; CLG refers to a clock generator CLG; a register FRG for generating feed pulses; a counter CNT; a digital output unit DOT; a flip-flop FF; X- and Y-axis buffer registers BX and BY; interpolators INTX and INTY; speed up circuits SUX and SUY; error registers ERX and ERY; drive output circuits AX and AY; servomotors SMX and SMY; position coders DETX and DETY or like detectors; a movable part of a machine to be controlled MP; and AND circuits A1 to A3. The positioning moment t1 stored in the memory M is determined on the basis of the period of vibration of the machine, as described above, and, for example, an X-direction command value for positioning is read out of the command tape TP and set in the memory M.

In the case of positioning by accelerating, the constant-speed and decelerating control as shown in FIG. 4, the content $\tau$ of the memory M is set for the accelerating, the constant-speed and the decelerating periods with each being $\frac{1}{3}$ of the positioning period T. The constant speed F and the acceleration K, which are derived as $F = b\ 3X/2t1$ and $K = 9X/2\ t1^2$ from $X = 2/3\ t1 \cdot F$ and $K = (F/\tau)'$, respectively, are operated by the central processing unit CPU and set in the memory M. $XD_i$ and $\Sigma_i XD_i$ are zero at the initial stage of operation, $XD_i$ being the displacement to be set in the buffer register BX and operated by the central processing unit CPU for the $i^{th}$ constant unit period of time of operation, its accumulated value being $\Sigma_i XD_i$.

The clock signal from the clock generator CLG is applied to the register FRG to generate feed pulses $f_p$ corresponding to the above constant unit periods of operating time, which are provided to the interpolators INTX and INTY. Further, the feed pulses $f_p$ are counted by the counter CNT, and its count content for a certain number of feed pulses and the set output of the flip-flop FF of the digital output unit DOT and AND'ed with each other in the AND circuit A1. In accordance with the output from the AND circuit A1, the AND circuits A2 and A3 are opened to pass on the contents of the buffer registers BX and BY to the interpolators INTX and INTY, respectively, and, at the same time, the output from the AND circuit A1 is applied as an interruption signal inr to the central processing unit CPU.

From the interpolators INTX and INTY are supplied, in accordance with the contents of the buffer registers BX and BY, signals to the error registers ERX and ERY via the speed up circuits SUX and SUY. From the drive output circuits AX and AY are provided drive signals to the servomotors SMX and SMY to drive the movable part MP, and detection signals by the position coders DETX and DETY are fed to the error registers ERX and ERY to control them so that their contents are reduced to zero; namely, the movable part MP is driven to the commanded position.

In the accelerating region from time 0 to $t\frac{1}{3}$, the output data $XD_i$ is given by the following operation:

$$XD_i = XD_{i-1} + K \qquad (1)$$

where $i = 0, 1, 2, 3, \ldots$ and $XD_0 = 0$, and where the constant unit time period is selected to have units such that its value is unity, for example 1 msec, with K and F expressed in consistent units. This output data XD is transferred to the buffer register BX from the memory M.

In the constant-speed region from the moment $t\frac{1}{3}$ to $2t\frac{1}{3}$, the output data XD is constant and given as follows:

$$XD_i = XD_{i-1} \qquad (2)$$

In the decelerating region from the moment $2t\frac{1}{3}$ to t1, the output data $XD_i$ is obtained by $$XD_i = XD_{i-1} - K \qquad (3)$$

A commanded value X is subtracted by each output data $XD_i$ and when the results $$(X) = X - \sum_{i=1}^{k} XD_L;$$

is reduced to zero the positioning pulse distribution is completed at the $k^{th}$ pulse. In the accelerating region, the following condition holds:

$$(X) - \sum_{i=1}^{k} X D_i \geq XD_{k+1}; \qquad 4$$

and the output data $XD_i$ is operated in accordance with equation (1).

The constant-speed region starts when the following condition is obtained:

$$XD_i = F \qquad (5)$$

and the constant output data XD is provided, as shown by equation (2). In the constant-speed region, the last accumulated value $\Sigma XD$ in the accelerating region is stored.

The decelerating region starts when the following condition is provided:

$$(X) - \sum_{i=1}^{k} X D_i < XD_{k+1}; \qquad 6$$

and by the operation of equation (3) the output data $XD_i$ is obtained, and when $$\sum_{i=1}^{k} XD_i$$

the positioning pulse distribution is finished.

In the positioning pulse distribution, a remainder distribution $F_L$ may in some cases result from the operation based on the commanded value X so that, at the end of the decelerating region an operation for the pulse distribution FL corresponding to the remainder is carried out. This is started with $XD_i \leq F_L$; and when $(X) > \Sigma_i XD_i$ the output data at the moment of the start of the remainder distribution operation is used as the output data and when $(X) \leq XD_i$ the remainder data (X) is used as the output data. In either case, the pulse distribution is completed $X - \Sigma XD_i = 0$.

In the case of positioning by the accelerating and the decelerating operation as shown in FIG. 3, the maximum speed F and the acceleration K are operated, for example, based on $\tau = t1/2$, $F = 2X/t1$ and $K = 4X/t1^2$, and are set in the memory M.

The decision as to the accelerating region is conducted by the operation of equation (4): and the decelerating region starts when the condition of equation (6) is established. The output data in the accelerating and decelerating regions are respectively obtained with equations (1) and (3), and the pulse distribution terminates after K unit operating periods when $X \Sigma_i XD_i = 0$. Where the remainder $F_L$ results, the pulse distribution is preformed as described above in the accelerating region.

As has been described in the foregoing, in the present invention the time for positioning a machine under numerical control is determined corresponding to the period of vibration of the machine and accelerating control and decelerating control or constant-speed control are conducted in the predetermined positioning time, thereby to complete the positioning when the amplitude of vibration of the machine is substantially zero; therefore, a positioning error due to vibration of the machine system can be reduced to zero or made negligibly small. Accordingly, the positioning control system of this invention enables accurate and high-speed positioning.

It will be apparent that many modifications and variations may be effected without departing from the scope of the novel concepts of this invention.

what is claimed is:

1. A positioning control system for a movable part of a machine under numerical control, said movable part having a known period of vibration, said system comprising means for positioning the machine in a time corresponding to the vibration period and means for controlling the accelerating and decelerating of said machine in predetermined portions of the positioning time to move the movable part to a commanded position in the positioning time.

2. A positioning control system according to claim 1, said predetermined portions each comprising ½ of said positioning time.

3. A positioning control system according to claim 1 comprising n of said predetermined portions in said positioning time with the first and last of said portions thereof corresponding to said accelerating and decelerating control, and means for constant-speed control of said movable part in the time interval between said acceleration and deceleration.

4. A positioning control system according to claim 1, 2 or 3 comprising a central processing unit, a memory accessible to said central processing unit, a servomotor for driving said movable part of the machine and a drive circuit for said servomotor, means for said memory to set said positioning time and said commanded position for said movable part, said central processing unit comprising means for controlling said drive circuit for said accelerating and decelerating in accordance with said positioning time and said commanded position, and said drive circuit comprising means for driving said servomotor to place said movable part of the machine at said commanded position at the end of said positioning time.

5. The system of claim 3, each said portion corresponding to said accelerating and decelerating control comprising 1/n of said positioning time.

* * * * *

UNITED STATES PATENT AND TRADEMARK OFFICE
CERTIFICATE OF CORRECTION

PATENT NO. : 4,287,460

DATED : 1 September 1981

INVENTOR(S) : RYOICHIRO NOZAWA et al.

It is certified that error appears in the above—identified patent and that said Letters Patent is hereby corrected as shown below:

Front page, [56] References Cited/Other Publications, "Legate" should be --Leggate--.

Col. 2, line 1, "DRAWING" should be --DRAWINGS--;

line 40, "TD" should be --DT--;

delete "CL6 refers to";

line 55, after "by" insert --the--;

line 56, change "and" to --and the--;

line 61, "F=b" should be --F=--;

both occurrences of "1" (NUMERAL) should be --l-- (small L);

line 62, "tl·F" should be --tl·F-- (small L);

"K=·(F/τ;" should be K=F/τ,--.

Col. 3, lines 4 and 7, "fp" should be --fp--;

line 10, "and" should be --are--;

UNITED STATES PATENT AND TRADEMARK OFFICE
CERTIFICATE OF CORRECTION

PATENT NO. : 4,287,460

DATED : 1 September 1981   Page 2 of 3

INVENTOR(S) : RYOICHIRO NOZAWA et al.

It is certified that error appears in the above—identified patent and that said Letters Patent is hereby corrected as shown below:

lines 36 and 40 "XD" should be --$\underline{XD_i}$--;

line 47, after "$\underline{XD_i}$" insert --,--;

"results" should be --result--;

line 48, "$XD_L$;" should be --$\underline{XD_i}$--;

line 52, "$\sum_{i=1}^{k}$" should be --$\sum_{i=1}^{i=k}$--; the equation numeral; "4" should be --(4)--.

Col. 4, line 2, "XD" should be --$\underline{XD_i}$--;

line 8, equation numeral "6" should be --(6)--;

line 11, "$\sum_{i=1}^{k} XD_{\underline{i}}$" should be --$X - \sum_{i=1}^{k} XD_{\underline{i}} = 0$--;

line 15, "so that," should be --, so that--;

line 17, "FL" should be --$F_{\underline{L}}$--;

line 19, "$(X) > \Sigma_{\underline{i}} XD_{\underline{i}}$" should be --$(X) > \Sigma XD_{\underline{i}}$--;

line 21, before "the" insert --,--;

line 23, "X-" should be --when X---;

line 27, each occurrence (3) of "1" (NUMERAL) should be --l-- (small L);

UNITED STATES PATENT AND TRADEMARK OFFICE
CERTIFICATE OF CORRECTION

PATENT NO. : 4,287,460

DATED : 1 September 1981

INVENTOR(S) : RYOICHIRO NOZAWA et al.

It is certified that error appears in the above—identified patent and that said Letters Patent is hereby corrected as shown below:

line 30, delete ":";

line 35, "K" should be --k--;

"X-" should be X---;

line 37, "preformed" should be --performed--;

"accelerating" should be --decelerating--;

line 55, "what" should be --What--.

Col. 6, line 2, "2 or 3" should be --2, 3 or 5--.

Signed and Sealed this

Second Day of February 1982

[SEAL]

Attest:

GERALD J. MOSSINGHOFF

Attesting Officer     Commissioner of Patents and Trademarks